US011101954B2

(12) United States Patent
Ramadan et al.

(10) Patent No.: US 11,101,954 B2
(45) Date of Patent: Aug. 24, 2021

(54) COMMUNICATION TECHNIQUES BASED ON ADAPTIVE NUMEROLOGY

(71) Applicant: Huawei Technologies Co., Ltd., Shenzhen (CN)

(72) Inventors: Ali Ramadan, Munich (DE); Karthikeyan Ganesan, Munich (DE); Malte Schellmann, Munich (DE); Mohamed Gharba, Munich (DE); Tapisha Soni, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 16/572,241

(22) Filed: Sep. 16, 2019

(65) Prior Publication Data

US 2020/0014512 A1 Jan. 9, 2020

Related U.S. Application Data

(63) Continuation of application No. PCT/EP2017/056314, filed on Mar. 16, 2017.

(51) Int. Cl.
*H04L 5/00* (2006.01)
*H04L 27/26* (2006.01)
(52) U.S. Cl.
CPC ........ *H04L 5/0048* (2013.01); *H04L 27/2613* (2013.01); *H04L 27/2695* (2013.01)
(58) Field of Classification Search
CPC ............... H04L 5/0048; H04L 27/2613; H04L 27/2695; H04L 27/2602
See application file for complete search history.

(56) References Cited

U.S. PATENT DOCUMENTS 10,637,620 B2 * 4/2020 Uchiyama ............. H04L 27/261
2006/0146948 A1 * 7/2006 Park ...................... H04L 5/0048
375/260

(Continued)

FOREIGN PATENT DOCUMENTS

CN 101662434 A 3/2010
CN 102685915 A 9/2012

(Continued)

OTHER PUBLICATIONS

Schaich et al., "Subcarrier spacing—how to make use of this degree of freedom," pp. 1-6, Institute of Electrical and Electronics Engineers, New York, New York (2016) (Year: 2016).*

(Continued)

*Primary Examiner* — Lan-Huong Truong
(74) *Attorney, Agent, or Firm* — Leydig, Voit & Mayer, Ltd.

(57) ABSTRACT

A mobile communication device has a receiver configured to receive a radio signal over a radio channel. The radio signal has a predetermined pilot preamble. The mobile communication device has a processor configured to determine mobility information, in particular a Doppler and/or a Delay Spread, based on the pilot preamble. The processor is further configured to signal the mobility information to a second communication device. A base station is also provided, having: a receiver configured to receive mobility information, in particular a Doppler and/or a Delay Spread, signaled by a mobile communication device; and a processor, configured to select a numerology based on the mobility information and to generate a radio signal for transmission to the communication device based on the numerology.

24 Claims, 12 Drawing Sheets

(56) References Cited

U.S. PATENT DOCUMENTS

| | | | | |
|---|---|---|---|---|
| 2007/0104174 | A1* | 5/2007 | Nystrom | H04W 16/12 370/343 |
| 2009/0280747 | A1* | 11/2009 | Sudarshan | H04L 25/0228 455/63.1 |
| 2015/0282123 | A1 | 10/2015 | Miao et al. | |

FOREIGN PATENT DOCUMENTS

| | | | |
|---|---|---|---|
| WO | 2007142393 | A1 | 12/2007 |
| WO | 2014121847 | A1 | 8/2014 |

OTHER PUBLICATIONS

"Dynamic resource allocation of different numerologies," 3GPP TSG-RAN WG1 Meeting #88, Athens, Greece, R1-1701661, XP051208828, pp. 1-6, 3rd Generation Partnership Project, Valbonne, France (Feb. 13-17, 2017).

"On Frame Structure for NR," 3GPP TSG RAN WG1 Meeting #86, Gothenburg, Sweden, R1-167754, XP051126076, pp. 1-4, 3rd Generation Partnership Project, Valbonne, France (Aug. 22-26, 2016).

"MAC Support of Multiple Numerologies," 3GPP TSG-RAN2 Meeting #Ad hoc, Spokane, Washington, USA, R2-1700083, XP051210670, pp. 1-6, 3rd Generation Partnership Project, Valbonne, France (Jan. 17-19, 2017).

"Scaled CP vs ECP: delay spread, Doppler and SNR tradeoff study," 3GPP TSG RAN WG1 Meeting #86bis, Lisbon, Portugal, R1-1610126, pp. 1-10, 3rd Generation Partnership Project, Valbonne, France (Oct. 10-14, 2016).

"3rd Generation Partnership Project; Technical Specification Group Radio Access Network; Evolved Universal Terrestrial Radio Access (E-UTRA); Multiplexing and channel coding (Release 12)," 3GPP TS 36.212 V125.0, pp. 1-94, 3rd Generation Partnership Project, Valbonne, France (Jun. 2015).

Zhang et al., "Filtered-OFDM-Enabler for Flexible Waveform in The 5th Generation Cellular Networks," pp. 1-6, IEEE, Institute of Electrical and Electronics Engineers, New York, New York (2015).

Schaich et al., "Fantastic-5G: Novel, flexible air interface for enabling efficient multi-service coexistence for 5G below 6 GHz," ETSI Workshop on Future Radio Technologies—Air Interfaces, Sophia Antipolis, France, pp. 1-10 (Jan. 27-28, 2016).

Schaich et al., "Subcarrier spacing—how to make use of this degree of freedom, " pp. 1-6, Institute of Electrical and Electronics Engineers, New York, New York (2016).

Schaich et al., "Subcarrier spacing—a neglected degree of freedom?" 2015 IEEE 16th International Workshop on Signal Processing Advances in Wireless Communications (SPAWC), pp. 56-60, Institute of Electrical and Electronics Engineers, New York, New York (2015).

"Mac Model in NR," 3GPP TSG-RAN WG2 Meeting #96, Reno, USA, R2-167950, pp. 1-4, 3rd Generation Partnership Project, Valbonne, France (Nov. 14-18, 2016).

* cited by examiner

COMMUNICATION TECHNIQUES BASED ON ADAPTIVE NUMEROLOGY

CROSS-REFERENCE TO RELATED APPLICATIONS

This application is a continuation of International Application No. PCT/EP2017/056314, filed on Mar. 16, 2017, the disclosure of which is hereby incorporated by reference in its entirety.

TECHNICAL FIELD

The present disclosure relates to communication techniques based on adaptive numerology, in particular to a mobile communication device signaling mobility information to a second communication device and a base station selecting numerology applied for transmission of a radio signal based on signaled mobility information. In particular, the disclosure relates to a system and method to support adaptive numerology in 5G-eV2x (5G enhanced Vehicle-to-everything) scenarios.

BACKGROUND

In 5G mobile communication systems, a plurality of slices and services can be provided. In the scenario of V2X (Vehicle-to-Everything), multiple V2X services are provided under extreme varying channels and hence fail to achieve the required QoS (Quality of Service). Due to varying scenarios of high/low mobility, high/low Doppler, small/large delay spread and various service demands for latency and reliability requirement, the mobile communication system cannot provide an acceptable performance.

SUMMARY

Embodiments of the present invention improve the performance in new radio networks, in particular in 5G enhanced Vehicle-to-everything (5G-eV2X) scenarios.

A basic idea of the present application is the introduction of an adaptive numerology solution based on UE (user equipment) centric estimates. Such an adaptive system numerology, e.g., with suitable subcarrier (SC) spacing, suitable length of cyclic prefix (CP), suitable pilot distribution, and suitable transmission time interval (TTI) based on channel conditions, provides means to increase the degrees of freedom for the PHY (physical layer device) design; and thus, improve performance to satisfy the required QoS.

A solution of embodiments of the present application is based on the finding that introduction of a Mobility indicator (MI) enables signaling of UE specific information on the experienced time-varying channel conditions, e.g. in terms of Doppler and multipath to base station (BS), and facilitates numerology adaptation, e.g., subcarrier spacing and cyclic prefix to maintain certain QoS target. Each tile (time-frequency resource unit) in the BS can be individually tailored to suit the UE's radio propagation environment. Mobility Information (MI) can also be used to influence different transmission mode and pilot spacing to achieve the required QoS. Different numerologies can exist for D2D-sidelink communication running in a dedicated frequency band and LTE Uu plane, controlled independently by the BS based on mobility information obtained for each individual link.

The above described solution includes three aspects. A first aspect is the introduction of an adaptive numerology and scheduling scheme in base station's L2 (layer 2). On the C-V2x link, the base station schedules users to different FDM/TDM (frequency division multiplexing/time division multiplexing) multiplexed numerologies on a shared resources across sub-frame based on their channel conditions (such as Doppler and delay spread estimate) and QoS requirements (such as reliability, latency) for cellular communication. On the sidelink, UEs adapt the numerology for a particular FDM/TDM resource (based on the assigned resource pools by the basestation) applicable for a V2V (vehicle-to-vehicle) scenario with the assistance from BS.

A second aspect it the introduction of new periodic time/frequency pilot preambles for robust estimation of Doppler and delay spreads. These estimates are used for numerology selection decision. The periodicity of these preambles can be decided by the base station.

A third aspect is creating the mobility indicator (MI) with user centric estimate and signaling method between base station and UE for both Uu and Pc5 interfaces.

The mobility indicator (MI) may include Delay and Doppler spread estimates and SNR (signal-to-noise ratio). MI can provide second order accurate statistical information about the Doppler and delay spread. Doppler and delay spread together with estimated SNR can be used to effectively adapt the numerology.

This solution provides robustness against Doppler and multipath in cellular V2x & V2V communication. UE can use Mobility Information (MI) to provide the base station with feedback regarding channel condition. Mobility indicator (MI) enables signaling of UE specific information on the experienced time-varying channel conditions, e.g. in terms of Doppler and multipath to BS. Hence, this solution facilitates numerology adaptation, e.g., adaptation of sub-carrier spacing and/or cyclic prefix to maintain a certain QoS target.

This solution provides dynamic (adaptive) scheduling of users to different FDM/TDM multiplexed numerologies on a shared radio resource for each slice. The disclosed solution provides new pilot design for RRM (Radio Resource Management) measurements (estimating Doppler and delay spread) at the UE taking into account different numerologies. The solution also provides new UE-centric feedback constituted of mobility index signaling based on UE-centric measurements.

The communication devices, e.g. UEs and base stations, described herein may be implemented in wireless communication networks, in particular communication networks based on mobile communication standards such as LTE and 5G, in particular new radio networks according to 3GPP New Radio (NR) standardization. The communication devices described herein may be implemented both in Base Station (BS), eNodeB, gNB and user equipment (UEs), for example in the scenario of cellular radio access networks. The disclosed radio devices may further be implemented in mobile devices (or mobile stations or user equipment (UE)), for example in the scenario of device-to-device (D2D) communication where one mobile device communicates with another mobile device or in the scenario of Vehicle-to-Everything (V2X) communications, where a radio cell in the vehicle communicates to any other device. The described communication devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The radio devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

In order to describe the present invention in detail, the following terms, abbreviations and notations will be used:
NR: New Radio
RTT: Round Trip Time
MI: Mobility Indicator or Mobility Information
DL: Downlink
UL: Uplink
BS: Base Station, eNodeB, eNB, gNB
UE: User Equipment, e.g. a mobile device or a machine type communication device
5G: $5^{th}$ generation according to 3GPP standardization
LTE: Long Term Evolution
RF: Radio Frequency
V2V: Vehicle to Vehicle
V2X: Vehicle to Everything
D2D: Device-to-device
RRM: Radio Resource Management
RRC: Radio Resource Control
SC: Sub carrier
CP: Cyclic Prefix
HARQ: Hybrid Automatic Repeat Request
CC: Component Carrier
PHY: Physical layer device
QoS: Quality of Service
CQI: Channel Quality Information According to a first aspect, the present application relates to a mobile communication device, comprising: a receiver, configured to receive a radio signal over a radio channel, the radio signal comprising a predetermined pilot preamble; and a processor, configured to determine mobility information, in particular a Doppler and/or a Delay Spread, based on the pilot preamble, wherein the processor is further configured to signal the mobility information to a second communication device.

The second communication device can be a base station or a UE. Mobility information can comprise speed of vehicle, sub-band CQI, channel parameters like Doppler spread, Delay Spread, etc.

Such a communication device signaling numerology information, e.g., with suitable subcarrier (SC) spacing, suitable length of cyclic prefix (CP), suitable pilot distribution and suitable transmission time interval (TTI) based on channel conditions provides means to increase the degrees of freedom for the PHY design and thus improve performance to satisfy the required QoS.

The introduction of the Mobility indicator (MI) enables signaling of UE specific information on the experienced time-varying channel conditions, e.g. in terms of Doppler and multipath to base station (BS), and facilitates numerology adaptation, e.g., subcarrier spacing and cyclic prefix to maintain certain QoS target. Each tile (time-frequency resource unit) in the BS can be individually tailored to suit the UE's radio propagation environment. Mobility Information (MI) can also be used to influence different transmission mode and pilot spacing to achieve the required QoS. Different numerologies can exist for D2D-sidelink communication running in a dedicated frequency band and LTE Uu plane, controlled independently by the BS based on mobility information obtained for each individual link.

In a first exemplary implementation form of the communication device according to the first aspect, the processor is configured to determine the mobility information such that it comprises Doppler spread and delay spread.

This provides the advantage that more information can be exploited by the BS for numerology adaptation.

In a second exemplary implementation form of the communication device according to the first implementation form of the first aspect, the Doppler and/or the Delay Spread are provided based on outer loop processing, wherein the outer loop processing is performed at a lower rate than a rate used for link adaptation between the communication device and the second communication device. The second communication device can be a base station, for example.

This provides the advantage that a computational complexity for numerology adaptation processing can be reduced when it is processed in the slower outer loop.

In a third exemplary implementation form of the communication device according to the first aspect as such or according to any of the preceding implementation forms of the first aspect, the processor is configured to determine a pilot of a first type pilot, which is used for channel estimation, and a pilot of a second type, whereas a pilot of this type is used for the determination of the mobility information.

This provides the advantage that the preamble can be flexibly adapted to different channel conditions in order to improve the estimation results.

In a fourth exemplary implementation form of the communication device according to the third implementation form of the first aspect, pilots of the first type are periodic with a radio subframe and the pilots of a second type are periodic with at least multiples of a radioframe of multiple subframes.

This provides the advantage that different pilots of different types can be flexibly applied for an optimal adjustment of mobility information.

In a fifth exemplary implementation form of the communication device according to the first aspect as such or according to any of the preceding implementation forms of the first aspect, the second communication device comprises a base station in a cellular vehicle-to-anything (C-V2x) scenario; or a mobile communication device in a vehicle-to-vehicle (V2V) scenario for a sidelink.

This provides the advantage that numerology adaptation can be flexibly applied in different scenarios such as C-V2x and V2V.

According to a second aspect, the application provides a base station, comprising: a receiver, configured to receive mobility information, in particular a Doppler and/or a Delay Spread, signaled by a mobile communication device, in particular a communication device according to the first aspect or any implementation form of the first aspect; and a processor, configured to select a numerology based on the mobility information; and to generate a radio signal for transmission to the mobile communication device based on the numerology.

Such a base station that selects numerology based on signaled numerology information, e.g., with suitable subcarrier (SC) spacing, suitable length of cyclic prefix (CP), suitable pilot distribution and suitable transmission time interval (TTI) based on channel conditions provides means to increase the degrees of freedom for the PHY design and thus improve performance to satisfy the required QoS.

The introduction of the Mobility indicator (MI) enables numerology selection based on signaling of UE specific information on the experienced time-varying channel conditions, e.g. in terms of Doppler and multipath to base station (BS), and facilitates numerology adaptation, e.g., subcarrier spacing and cyclic prefix to maintain certain QoS target. Each tile (time-frequency resource unit) in the BS can be individually tailored to suit the UE's radio propagation environment. Mobility Information (MI) can also be used to influence different transmission mode and pilot spacing to achieve the required QoS. Different numerologies can exist for D2D-sidelink communication running in a dedicated frequency band and LTE Uu plane, controlled independently by the BS based on mobility information obtained for each individual link.

In a first exemplary implementation form of the base station according to the first aspect, the numerology is based on at least one of the following parameters based on the mobility information: a subcarrier spacing, a length of cyclic prefix, a pilot distribution, in particular of pilots of the first type, a transmission time interval.

This provides the advantage that numerology can be precisely adjusted when using information from these parameters and latency can be reduced when applying the suitable numerology.

In a second exemplary implementation form of the base station according to the second aspect as such or according to the first implementation form of the second aspect, the processor is configured to select the numerology based on the mobility information and a Quality-of-Service requirement.

This provides the advantage that Service Level Agreements can be fulfilled when determining numerology based on QoS requirements.

In a third exemplary implementation form of the base station according to the second aspect as such or according to any of the preceding implementation forms of the second aspect, the processor is configured: to select a numerology for a sidelink communication of the mobile communication device based on mobility information received for the sidelink, and to select a numerology for a central communication link of the mobile communication device with the base station based on mobility information received for the central communication link.

This provides the advantage that numerology adaptation can be flexibly applied in different scenarios such as central communication link and sidelink. Hence latency can be reduced depending on the scenario.

In a fourth exemplary implementation form of the base station according to the second aspect as such or according to any of the preceding implementation forms of the second aspect, the processor is configured: to perform an outer loop processing comprising the numerology selection and/or a numerology configuration, wherein the outer loop processing is performed at a lower rate than a rate used for link adaptation between the base station and a mobile communication device.

This provides the advantage that a computational complexity for numerology adaptation processing can be reduced when it is processed in the slower outer loop.

Numerology selection can be a selection from predetermined numerologies while numerology configuration can be an establishment or initialization of a new generated numerology.

In a fifth exemplary implementation form of the base station according to the fourth implementation form of the second aspect, the processor is configured to re-configure a radio bearer to different time-frequency resources having a numerology based on the mobility information.

This provides the advantage that fast bearer reconfiguration can be achieved.

Communication can be a cellular vehicle-to-anything (C-V2x) scenario. For a device-to-device (D2D) scenario, the processor can be configured to re-configure the numerology of a D2D bearer having allocated time-frequency resources.

In a sixth exemplary implementation form of the base station according to the second aspect as such or according to any of the preceding implementation forms of the second aspect, the base station comprises: a shared hybrid automatic repeat request (HARQ) entity across different numerologies, wherein the processor is configured to trigger each HARQ redundancy versions based on the mobility information to a different numerology.

This provides the advantage that the number of HARQ retransmissions can be reduced, when HARQ retransmission is based on specific numerology.

In a seventh exemplary implementation form of the base station according to the second aspect as such or according to any of the preceding implementation forms of the second aspect, the processor is configured to select the numerology for at least one component carrier transmitting the radio signal.

This provides the advantage that the transmission behavior of the component carriers can be improved.

In an eighth exemplary implementation form of the base station according to the second aspect as such or according to any of the preceding implementation forms of the second aspect, the processor is configured to insert a predetermined pilot preamble into the radio signal, wherein the pilot preamble (pilot of second type) is configured to determine channel conditions, in particular a Doppler and/or a Delay Spread.

This provides the advantage that using specific pilot preambles, Doppler and/or Delay Spread on the radio channel can be better estimated than using a single pilot pattern for both Doppler, Delay and channel estimation.

In a ninth exemplary implementation form of the base station according to the second aspect as such or according to any of the preceding implementation forms of the second aspect, the processor is configured: to receive a request for a new dedicated radio bearer from the communication device, in particular a user equipment in connected mode, and to configure a numerology of the new dedicated radio bearer based on a QoS-requirement based on the mobility information.

This provides the advantage that configuring numerology based on priorities allows faster transmission for high priority signals.

Priority of the requested radio bearer with prior measurement knowledge about Doppler and delay spread estimates can be obtained when the communication device is connected to the base station.

According to a third aspect, the present application provides a method for configuring a numerology for a radio transmission, the method comprising: receiving mobility information, in particular a Doppler and/or a Delay Spread, signaled by a mobile communication device; and selecting a numerology based on the mobility information and generating a radio signal for transmission to the mobile communication device based on the selected numerology.

Such a method that selects numerology based on signaled numerology information, e.g., with suitable subcarrier (SC) spacing, suitable length of cyclic prefix (CP), suitable pilot distribution and suitable transmission time interval (TTI) improves performance to satisfy the required QoS.

BRIEF DESCRIPTION OF THE DRAWINGS

Further embodiments of the present invention will be described with respect to the following figures, in which.

DETAILED DESCRIPTION OF THE EMBODIMENTS

In the following detailed description, reference is made to the accompanying drawings, which form a part thereof, and in which is shown by way of illustration exemplary aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
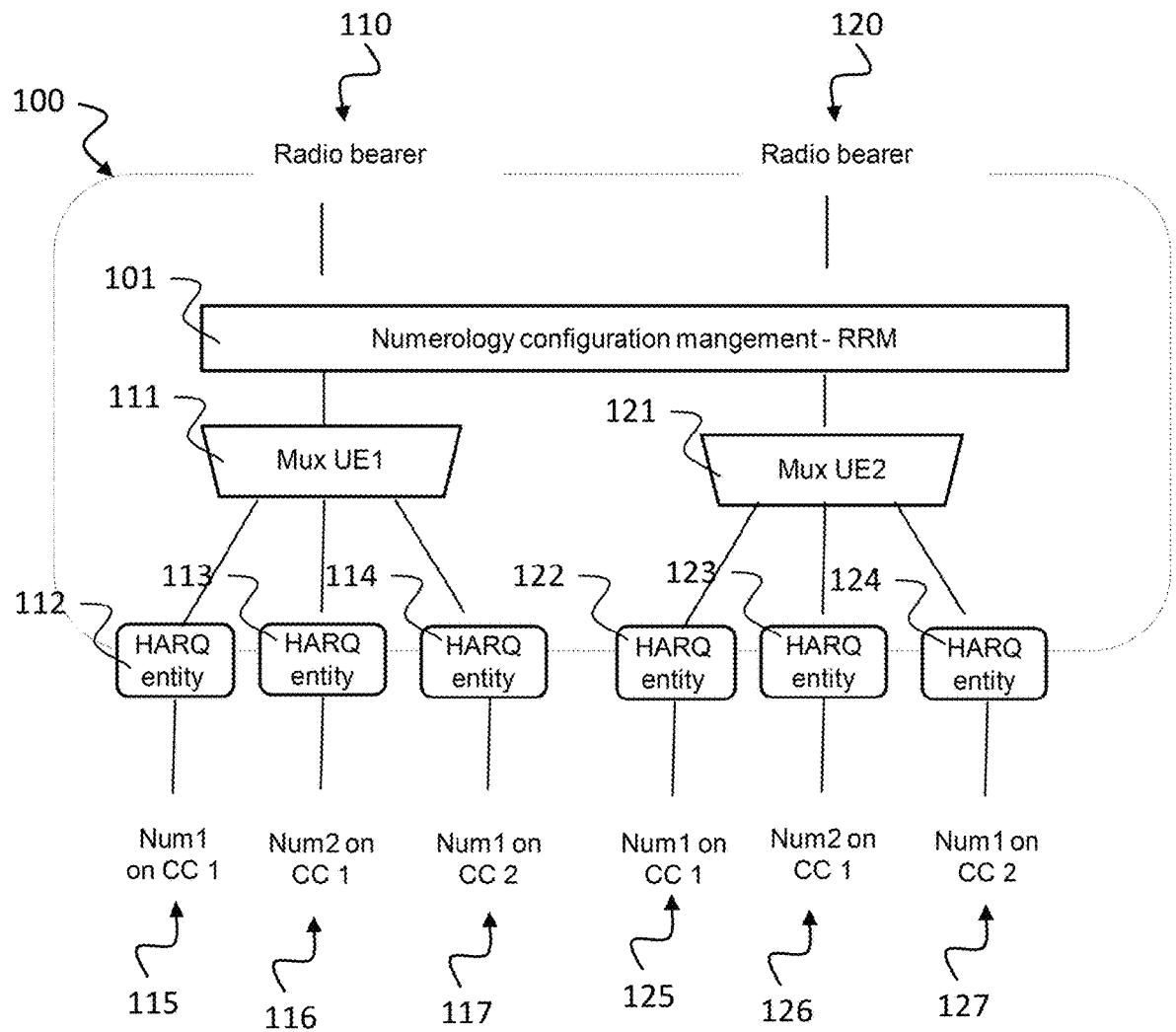
FIG. 1 shows a schematic diagram illustrating a base station design for different numerology and component carriers according an exemplary implementation form.

FIG. 1 shows a schematic diagram illustrating a base station design 100 for different numerology and component carriers according an exemplary implementation form. The base station 100 includes a numerology configuration management module 101, e.g. within radio resource management (RRM) for configuring radio bearers 110, 120 with a respective numerology. The radio bearers 110, 120 configured with the respective numerology are multiplexed in a first multiplexer module 111 for transmission to first user equipment UE1. The radio bearers 110, 120 configured with the respective numerology are multiplexed in a second multiplexer module 121 for transmission to second user equipment UE2. The base station 100 includes a first plurality of HARQ (Hybrid Automatic Repeat Request) entities 112, 113, 114 for transmission control of radio signals to be transmitted to UE1. An exemplary number of three such HARQ entities are depicted in FIG. 1. A first HARQ entity 112 controls transmission over component carrier CC1 with first numerology Num1, a second HARQ entity 113 controls transmission over component carrier CC1 with second numerology Num2 and a third HARQ entity 114 controls transmission over component carrier CC2 with first numerology Num1. Other configurations are possible, as well.

The base station 100 includes a second plurality of HARQ (Hybrid Automatic Repeat Request) entities 122, 123, 124 for transmission control of radio signals to be transmitted to UE2. An exemplary number of three such HARQ entities are depicted in FIG. 1. A fourth HARQ entity 122 controls transmission over component carrier CC1 with first numerology Num1, a fifth HARQ entity 123 controls transmission over component carrier CC1 with second numerology Num2 and a sixth HARQ entity 124 controls transmission over component carrier CC2 with first numerology Num1. Other configurations are possible, as well.

In the following, an exemplary implementation of the numerology configuration management module 101 is described. The numerology configuration management module 101 can be used for dynamic configuration of resource for C-V2x. Numerology configuration management in the Base station's 100 RRM 101 can have the following functionalities:

Base station 100 can dynamically adapt L1 configuration (i.e. numerology, time/frequency resource etc.) for each user based on the radio channel measurement to achieve certain QoS target in case of ultra-reliable low latency communication based on the MI (mobility information or mobility indicator) feedback.

Every UE may have one primary numerology and one or more secondary numerology based on the capability of the UE, where each numerology may act as a separate carrier (CA, carrier aggregation), and aggregation of carrier with different numerology may be supported. Base station 100 can decide the primary numerology during initial access and/or connected mode based on the radio measurement information like mobility indicator (e.g. Doppler/delay spread estimate from UE) and/or Timing advance, SINR from UE.

Base station 100 can move the primary numerology of the UE context from existing time/frequency resource with X numerology settings to different time/frequency resource with Y numerology settings. The numerology settings already supported by the Base station 100 may be based on the MI feedback.

Base station 100 can support cross-carrier HARQ scheduling with different numerology based on the mobility indicator and SNR as described with respect to the below Figures.

Base station 100 may reconfigure existing time/frequency resources for a sidelink communication (e.g. based on the assigned resource pools) via explicit signaling via DCI (downlink control information) or RRC (radio resource control) sidelink dedicated signaling to different numerology based on the feedback of mobility information from UE.

Numerology configuration management can take care of numerology reconfiguration of radio bearer to suitable numerology based on the MI feedback, which may be present in the base station 100. RRM 101 may collect the physical layer measurement result from all UE tiles (or also named resource elements) and may keep record of the QoS requirement for every UE service.

Numerology configuration management 101 can have an interface with RRC layer (using RRC dedicated signaling) for updating UE numerology reconfiguration depending on the service and physical layer parameter estimates.

To achieve reliable retransmission scheme for HARQ in DL for variant channel conditions, each retransmission may be triggered by the base station 100 with different numerologies based on the decoded MI information, as described hereinafter with respect to the following figures.

The different retransmission may be allocated to different FDM/TDM data regions with different numerologies as described below.

During RRC dedicated bearer establishment procedure after the connected mode, the request can choose the numerology based on the priority of the request and the MI feedback at the time.

Figure 2:
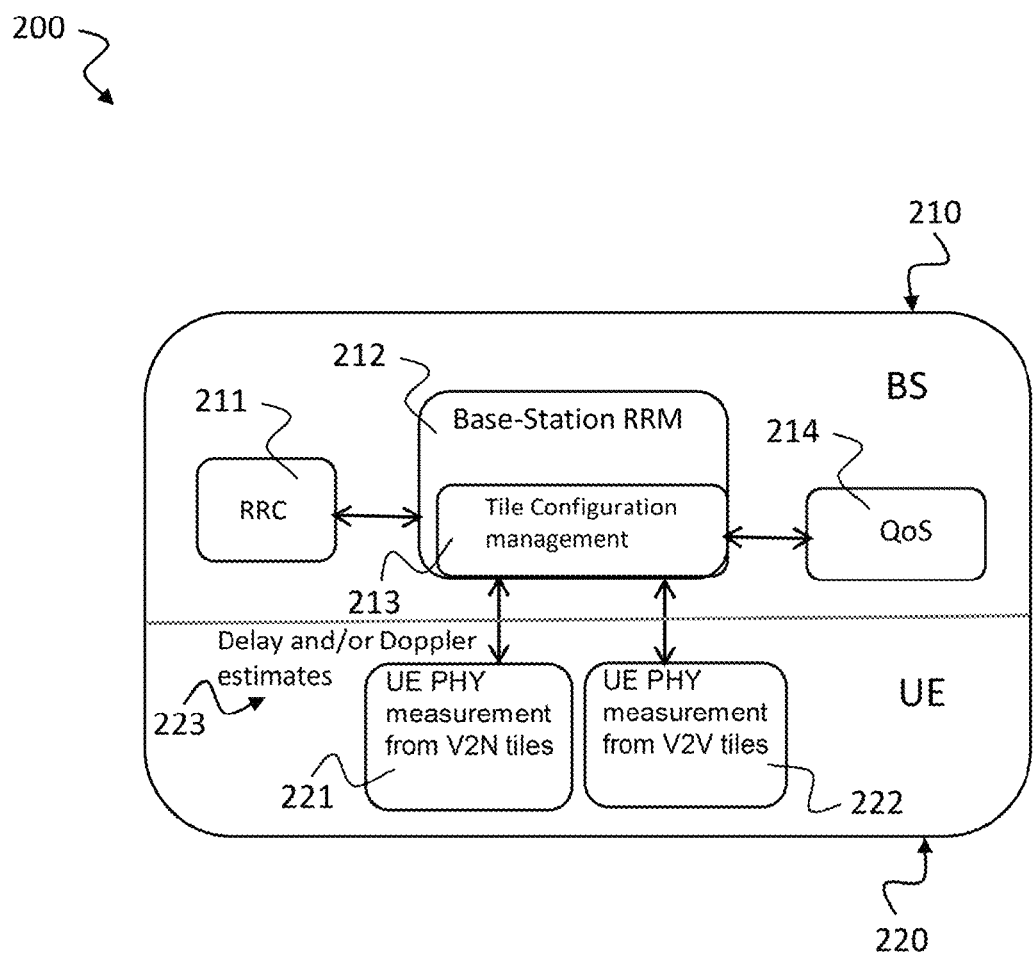
FIG. 2 shows a block diagram illustrating the interfaces of a communication system with base station and user equipment according to exemplary an implementation form.

FIG. 2 shows a block diagram illustrating the interfaces of a communication system 200 with base station 210 and user equipment 220 according to an implementation form.

The BS 210 includes a base station RRM module 212 that may correspond to the RRM module 101 described above with respect to FIG. 1 where numerology is configured. The base station RRM module 212 includes a Tile Configuration management module 213 for configuring tiles for the radio signal, e.g. as described below with respect to FIG. 3. A tile may be a resource element or a resource block allocated for transmission of the radio signal to a communication device, e.g. a UE. The tile may include a frequency range and a time range allocated for transmission. The BS 210 further includes a radio resource control (RRC) module 211 and a QoS (Quality of Service) module 214 interworking with the BS RRM module 212 for selecting the suitable numerology.

The UE 220 can transmit Delay and/or Doppler estimates 223 to the BS 210. These Delay and/or Doppler estimates 223 may be generated in a UE PHY measurement module, e.g. a UE PHY measurement module from V2N tiles 221 or a UE PHY measurement module from V2V tiles 222. In one example, the UE PHY measurement module from V2N tiles 221 can provide the measurements for a central link to BS 210 and the UE PHY measurement module from V2V tiles 222 can provide the measurements for a sidelink with another UE 220.

In the following, an exemplary implementation of the Tile Configuration management module 213 in the BS 210 is described. Tile configuration management 213 in the Base station's RRM 212 may have the following functionality: Dynamic adaptation of L1 configuration of Users for each RAN slice based on the radio channel measurement to achieve certain QoS target; Base station 210 can move the UE context from existing tile with X numerology settings to different tile with Y numerology settings—provided the different tile settings already supported by the BS; Base station 210 can reconfigure existing tiles to different numerology based on the feedback of mobility information from UE 220. Tile configuration management 213 takes care of tiles reconfiguration, collects the physical layer measurement result from all UE tiles and keeps record of the QoS requirement for every UE service, e.g. indicated by the QoS module 214. Tile configuration management 213 has an interface with RRC layer (using RRC dedicated signaling 211) for updating UE tile reconfiguration depending on the service and physical layer parameter estimates.

The UE 220 can generate UE centric estimates of quantized normalized Doppler and delay spread estimates with respect to subcarrier spacing/sampling frequency or CP length (referred to as mobility indicator) measured from Uu plane and Pc5 interface and can transmit these estimates to the Base station 210. The Base station RRM module 212 can decide numerology adaptation of a certain radio bearer in-case of Uu plane and Pc5 interface based on the UE centric estimates and can change the configuration of the radio bearer numerology settings with RRC reconfiguration message. In case of RRC dedicated bearer establishment in connected mode (UE connected in default mode), Base station 210 can assign the numerology configuration of the dedicated radio bearer based on the UE centric estimates received in connected mode (with default bearer). The base station 210 can change the primary numerology configuration of the UE 220 from setting x that was assigned during the connected mode to setting y based on the mobility indicator with help of RRC reconfiguration message in order to enable service continuity to provide certain reliability. Mobility indicator may include the Delay and/or Doppler estimates 223 measured by UE 220. To achieve reliable retransmission scheme for HARQ in DL for variant channel conditions, each retransmission can be triggered by the base station 210 with different numerologies based on the decoded MI information, e.g. the Delay and/or Doppler estimates 223 measured by UE 220. A unified Pilot sequence based on preamble across different numerologies, e.g. as described below with respect to FIG. 3, may be used to estimate the Doppler Delay Spread estimate 223. The periodicity of the sub-frames carrying pilot preambles may be dynamically decided by the base station 210. In one implementation, the preamble is not required every sub-frame, since the estimation is needed only for Doppler and delay spread which do not vary much. RRM measurement can be dynamically activated and the Mobility information, e.g. including the Delay and/or Doppler estimates 223, can be signaled to BS 210.

Figure 3:
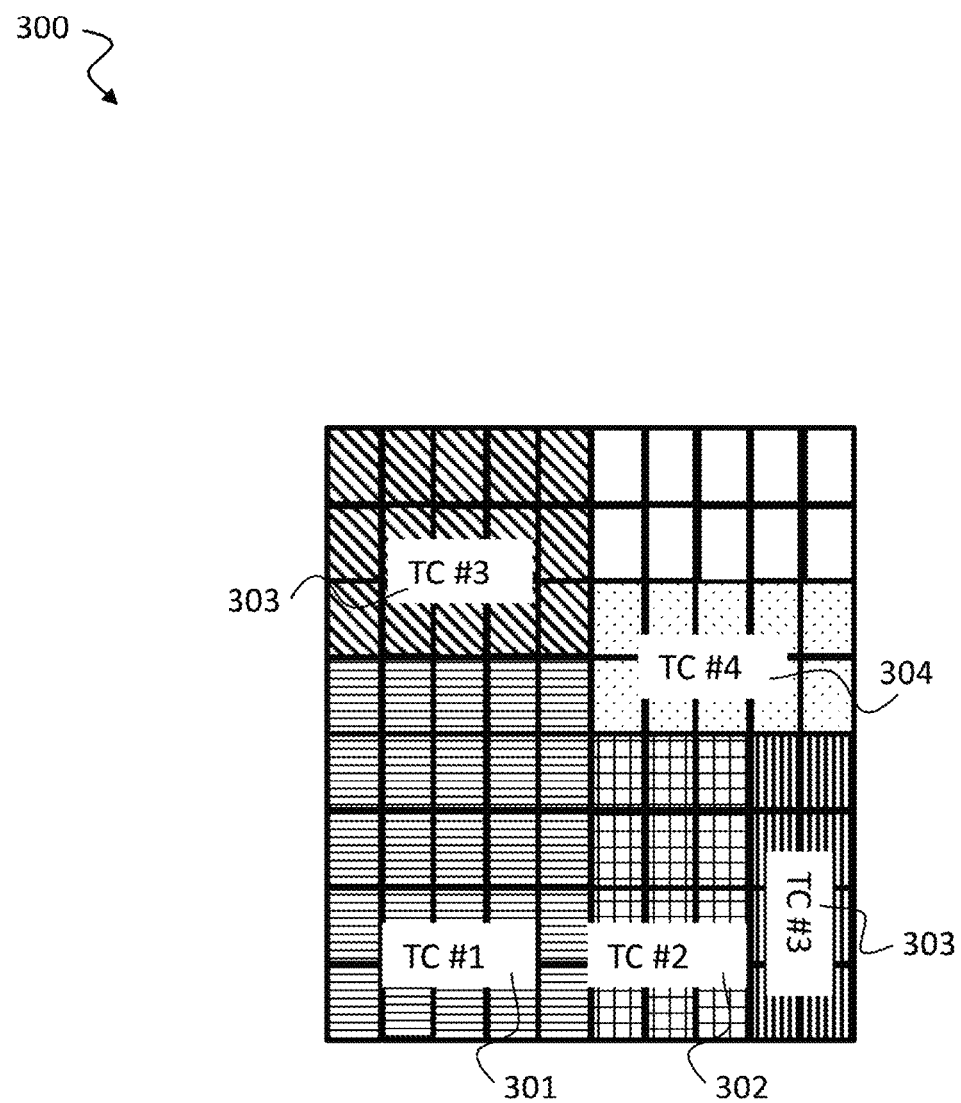
FIG. 3 shows a schematic diagram illustrating a radio resource with different numerologies within a single transmission time interval (TTI)

FIG. 3 shows a schematic diagram illustrating a radio resource 300 with different numerologies within a single transmission time interval (TTI). The horizontal axis illustrates time or slots of the radio resource while the vertical axis illustrates frequency or subcarriers of the radio resource. The radio resource includes multiple tile configurations TC #1, 301, TC #2, 302, TC #3, 303 and TC #4, 304, which are distributed over areas with respect to time and frequency. Each tile configuration corresponds to a different numerology. For example TC #1 is configured according to a first numerology 301, TC #2 is configured according to a second numerology 302, TC #3 is configured according to a third numerology 303 and TC #4 is configured according to a fourth numerology 304. FIG. 3 only depicts an exemplary configuration, whereas other distributions of tile configurations are possible, as well.

Figure 4:
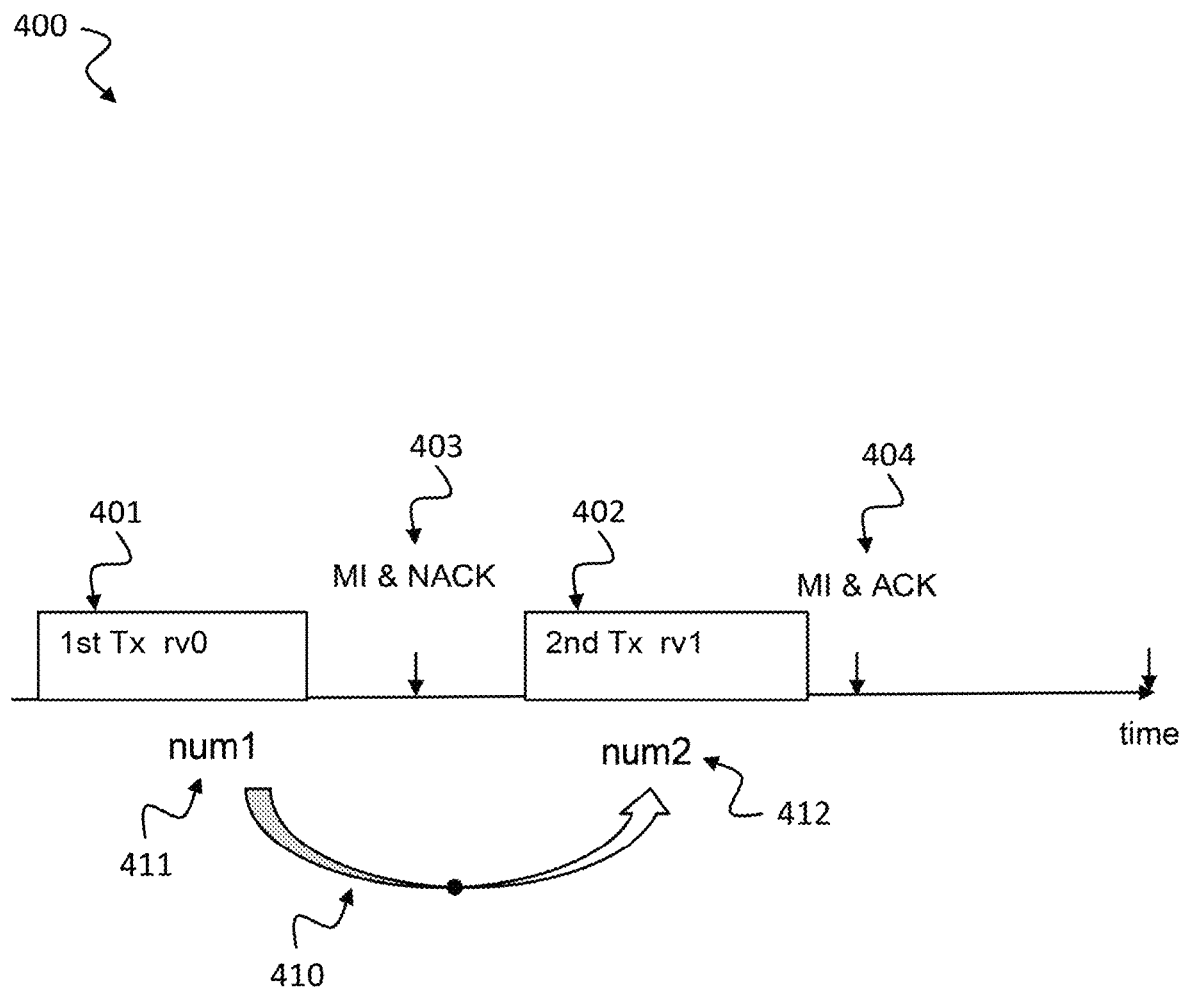
FIG. 4 shows a schematic diagram illustrating an adaptive HARQ scheme with different numerologies according to an exemplary implementation form.

FIG. 4 shows a schematic diagram illustrating an adaptive HARQ scheme 400 with different numerologies according to an implementation form. A first transmission 401 may be configured according to a first numerology 411. A second transmission 402 may be configured according to a second numerology 412. In this example, after the first transmission 401, mobility information with NACK 403 (non-acknowledgment) is transmitted, e.g. from a UE 220 to a BS 210 as described above with respect to FIG. 2. This signal 403 can be used as a trigger to change 410 the numerology from first numerology 411 to a second numerology 412. The second transmission 402 can then be provided based on the second numerology 412. After the second transmission 402, further mobility information with ACK 404 (acknowledgment) is transmitted, e.g. from a UE 220 to a BS 210 as described above with respect to FIG. 2. This ACK can be used as a trigger to keep the second numerology 412 for further transmissions.

To achieve reliable retransmission scheme for HARQ in DL (e.g. from BS 210 to UE 220) for variant channel conditions, each retransmission 401, 402 can be triggered by the base station 210 with different numerologies 411, 412 based on the decoded MI information 403, 404. The different retransmission can be allocated to different FDM/TDM data regions with different numerologies as described above with respect to FIG. 3.

Figure 5:
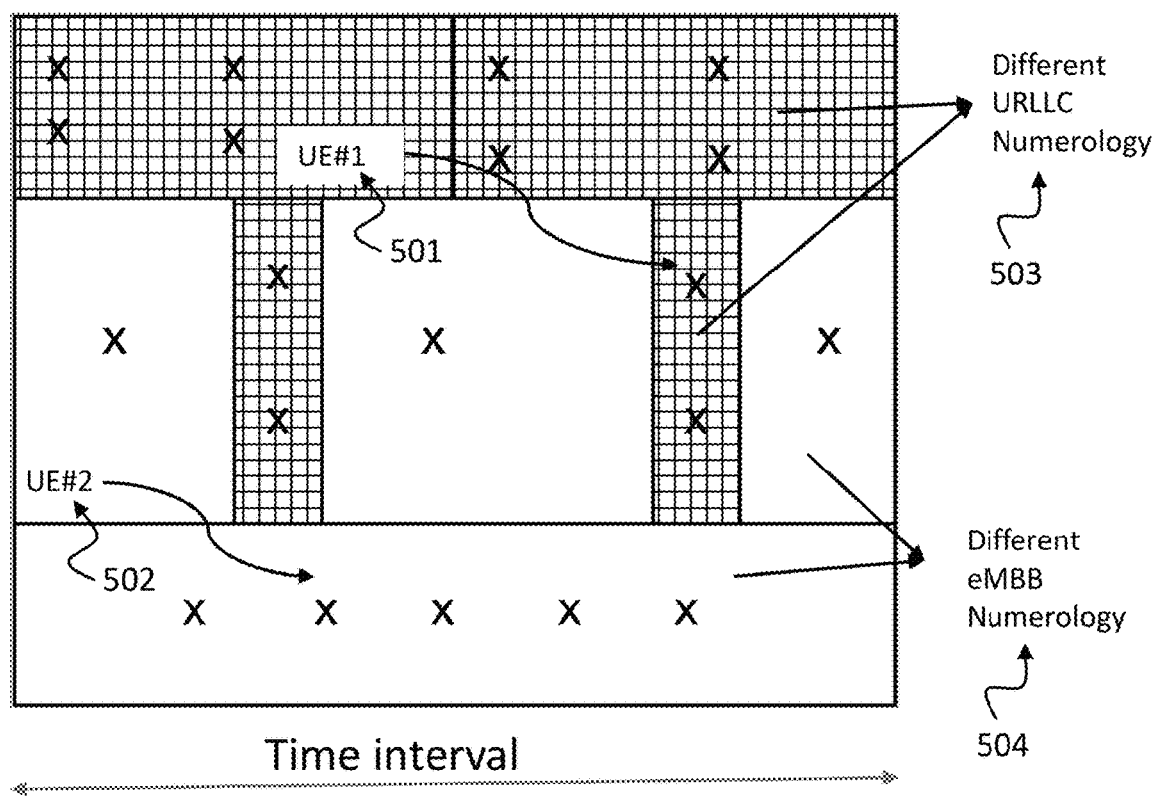
FIG. 5 shows a schematic diagram illustrating a radio resource with dynamic switching of numerology.

FIG. 5 shows a schematic diagram illustrating a radio resource 500 with dynamic switching of numerology. The horizontal axis illustrates time or slots of the radio resource 500 while the vertical axis illustrates frequency or subcarriers of the radio resource 500. In this example radio resources dedicated for a first user equipment UE #1 501 can have a first numerology 503, e.g. an URLLC (ultra-reliable low latency communication) numerology that is different from a second numerology 504, e.g. an eMBB (enhanced Mobile Broadband) numerology, of radio resources dedicated for a second user equipment UE #2, 502. To achieve certain QoS target like reliability, latency-BS can move UE context across different TDM/FDM mux regions having different numerology settings 503, 504 as shown in FIG. 5.

Figure 6:
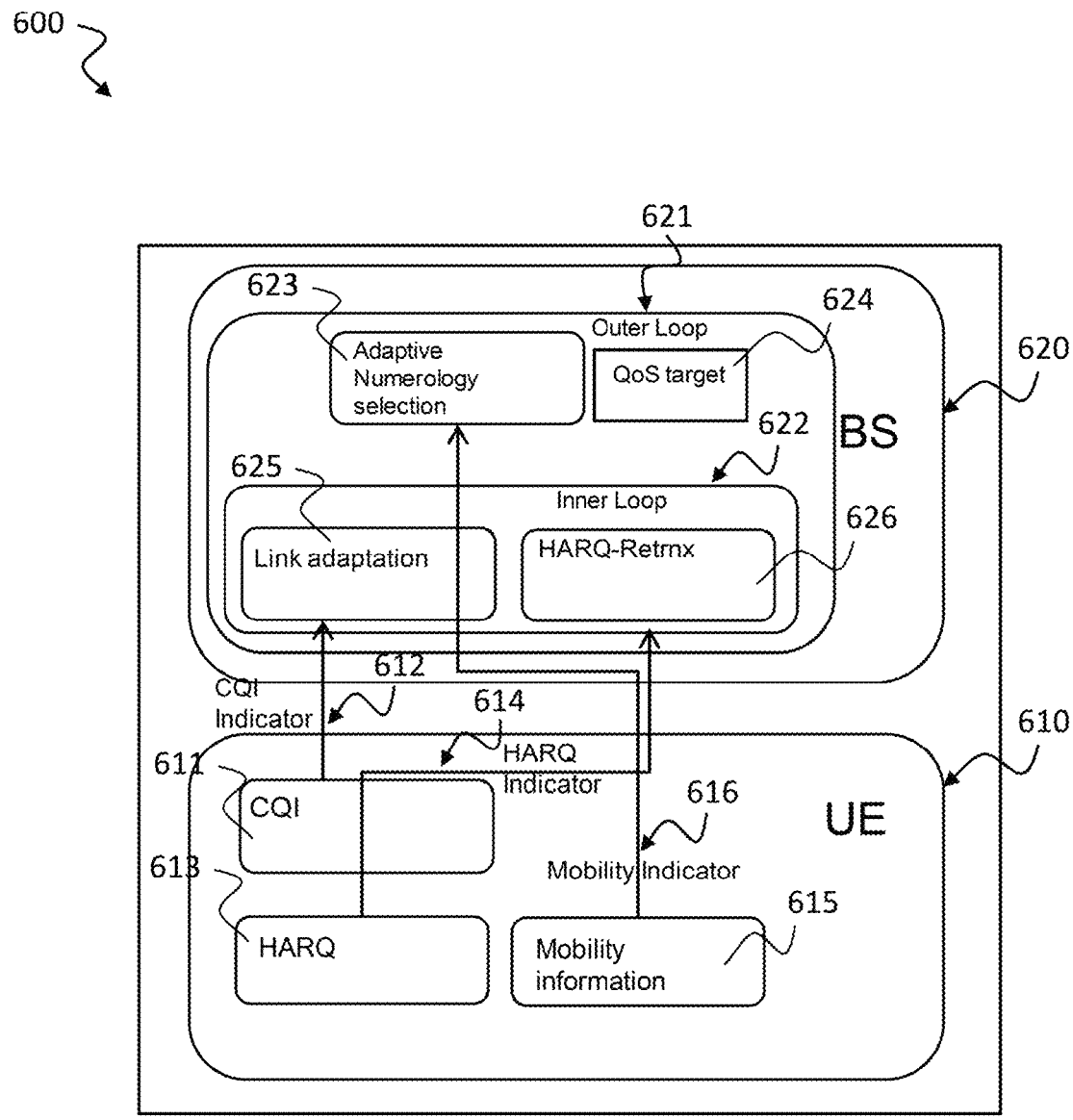
FIG. 6 shows a block diagram illustrating dynamic link adaptation in a communication system with base station and user equipment, where outer-loop processing is dedicated to numerology adaptation according to an implementation form.

FIG. 6 shows a block diagram illustrating dynamic link adaptation in a communication system 600 with base station 620 and user equipment 610, where outer-loop processing 621 is dedicated to numerology adaptation according to an implementation form.

In the BS 620, a processor implements outer loop processing 621 with adaptive numerology selection 623 that may correspond to the tile configuration management module 213 described above with respect to FIG. 2 or the numerology configuration management 101 described above with respect to FIG. 1. The outer loop processing 621 may also implement QoS processing 624 with QoS targets, which may be used as requirements for configuring the numerology. Adaptive numerology selection 623 receives mobility information 615, e.g. a mobility indicator 616 determined by the UE 610 for selecting a suitable numerology. Link adaptation 625 and HARQ retransmission 626 is performed by inner loop processing 622 implemented on a processor of the BS 620. HARQ retransmission 626 may be performed based on an HARQ indicator 614 provided by a HARQ module 613 implemented on the UE 610 and based on a CQI (Channel Quality Information) indicator 612 provided by a CQI module 611 implemented on the UE 610. A processing rate of the inner loop processing 622 may be higher than a processing rate of the outer loop processing 621. For example, inner loop processing 622 may be performed on a sub-frame basis while outer loop processing 621 may be performed on a multiple sub-frame bases.

The functionality of the communication system 600 may correspond to the functionality described above for the communications system 200 of FIG. 2.

The communication system 600 allows implementation of hierarchical link adaptation (LA) with fast inner 622 and slow outer 621 loop, where the outer loop 621 is dedicated to the numerology adaptation for a particular tile.

As shown in FIG. 6, in the communication system 600 numerology adaptation can coexist with Link adaptation and HARQ. Base station link adaptation algorithm may be based on the CQI report 612 received from UE 610 and the QoS requirement, e.g. indicated by QoS target module 624. To achieve adaptive system numerology, feedback 616 about the mobility information 615 received from the UE 610 can be mapped to the numerology setting table at the BS 620, which selects the best numerology settings that satisfy certain QoS target 624 as shown in FIG. 6. The outer slower loop 621 of numerology selection 623 is based on the UE specific mobility index+SNR condition at that instant for every RAN slice/service.

Figure 7:
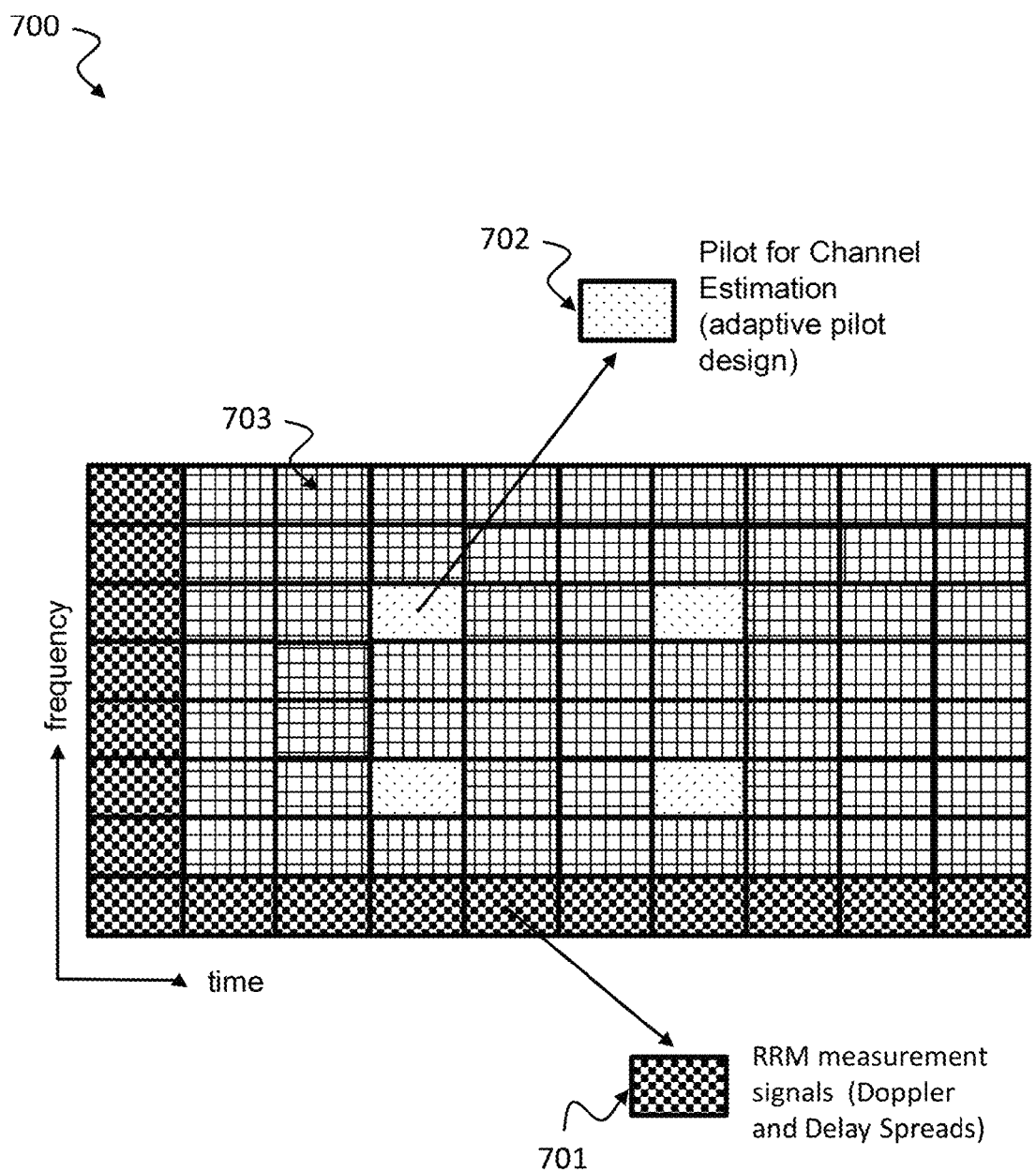
FIG. 7 shows a schematic diagram illustrating an exemplary pilot pattern usable for numerology adaptation according to an exemplary implementation form.

FIG. 7 shows a schematic diagram illustrating an exemplary pilot pattern 700 usable for numerology adaptation according to an implementation form. Such pilot pattern 700 includes a first plurality of tiles or resource elements 701 that may be used as RRM measurement signals for measuring Doppler and/or Delay Spreads. The pilot pattern 700 includes a second plurality of tiles or resource elements 702 that may be used as Pilot for channel estimation, e.g. according to an adaptive pilot design. The pilot pattern 700 further includes a third plurality of tiles or resource elements 703 that may be used for other purposes and/or for data transmission.

In one exemplary implementation, the pilot pattern 700 may implement a DL (downlink) unified preamble based pilot design 701 (e.g. as Broadcast) for RRM measurement and adaptive pilot design 702 for channel estimation. The Pilot preambles 701 are arranged in time and Frequency for RRM measurement as follows: a unified Pilot 701 is arranged across different numerologies to estimate the Doppler Delay Spreads. The periodicity of the sub-frames carrying pilot preambles can be dynamically decided by the base station. In one implementation the preamble is not required every sub-frame, since the estimation is needed only for Doppler and delay spread which do not vary much. Uniform Doppler-delay spread estimates due to RRM measurement signal helps in adaptive pilot distribution for estimating the channel conditions: This can be achieved by using Scattered Pilots 702 as shown in FIG. 7.

Figure 8:
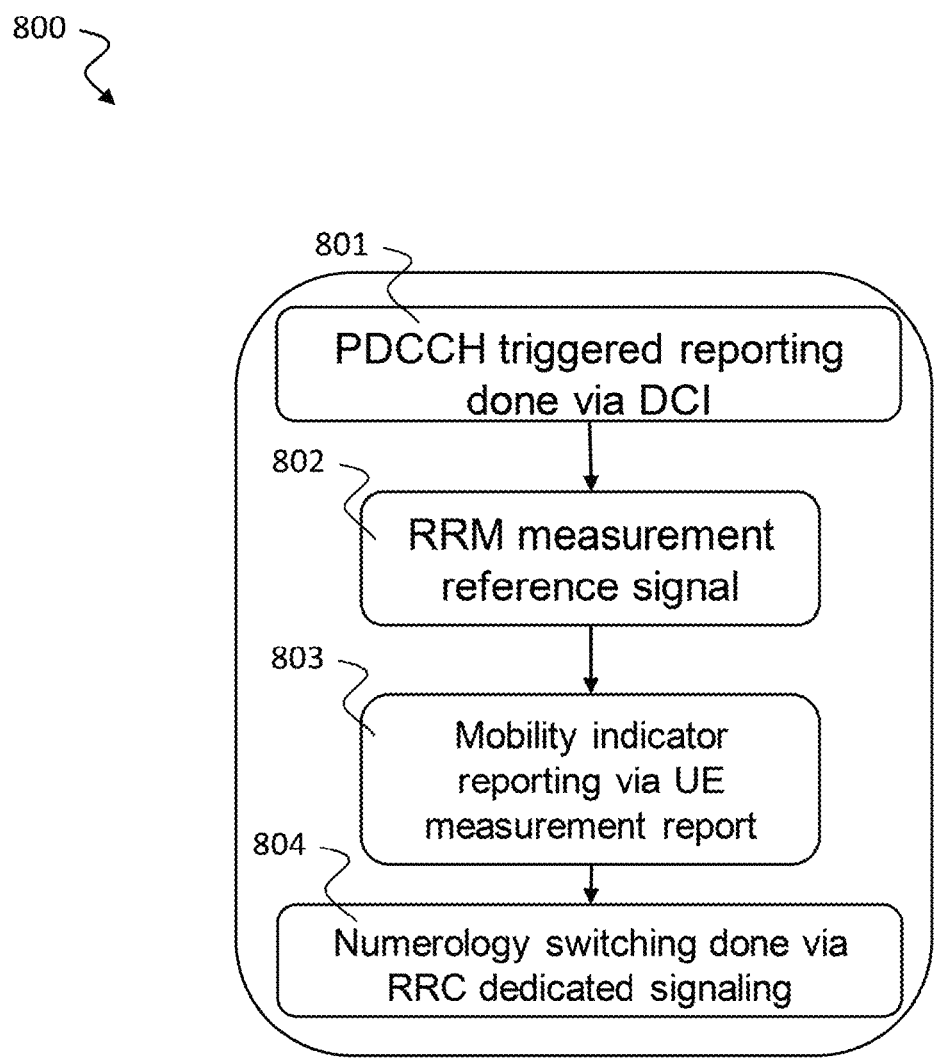
FIG. 8 shows a schematic diagram illustrating a method for dynamic activation of RRM measurement and mobility information signaling according to an exemplary implementation form.

FIG. 8 shows a schematic diagram illustrating a method 800 for dynamic activation of RRM measurement and mobility information signaling according to an exemplary implementation form. In a first block 801, PDCCH (physical downlink control channel) triggered reporting is done via DCI. In a succeeding second block 802, RRM measurement reference signal is determined. In a succeeding third block 803, Mobility indicator reporting via UE measurement report is performed. In a succeeding fourth block 804, numerology switching is done via RRC dedicated signaling, e.g. as described above with respect to FIGS. 1 to 7.

In a C-V2x scenario the method 800 can be implemented as follows: Mobility indicator content is reported via UE measurement reporting to BS's tile configuration management. Base station Tile configuration management is responsible for mapping the mobility indicator value to the particular numerology system settings. Re-configuration of numerology settings for that user (e.g. based on the measurement report) may be done via RRC dedicated signaling (e.g. by RRC re-configuration message).

In a V2V scenario for sidelink, the method 800 can be implemented as follows: UE can decide to change the numerology based on its own measurements and threshold, then informs the BS via RRC measurement report. Then the BS can re-configure to D2D UEs (or UEs involved in cooperative communication) to a selected numerology via RRC re-configuration.

Figure 9:
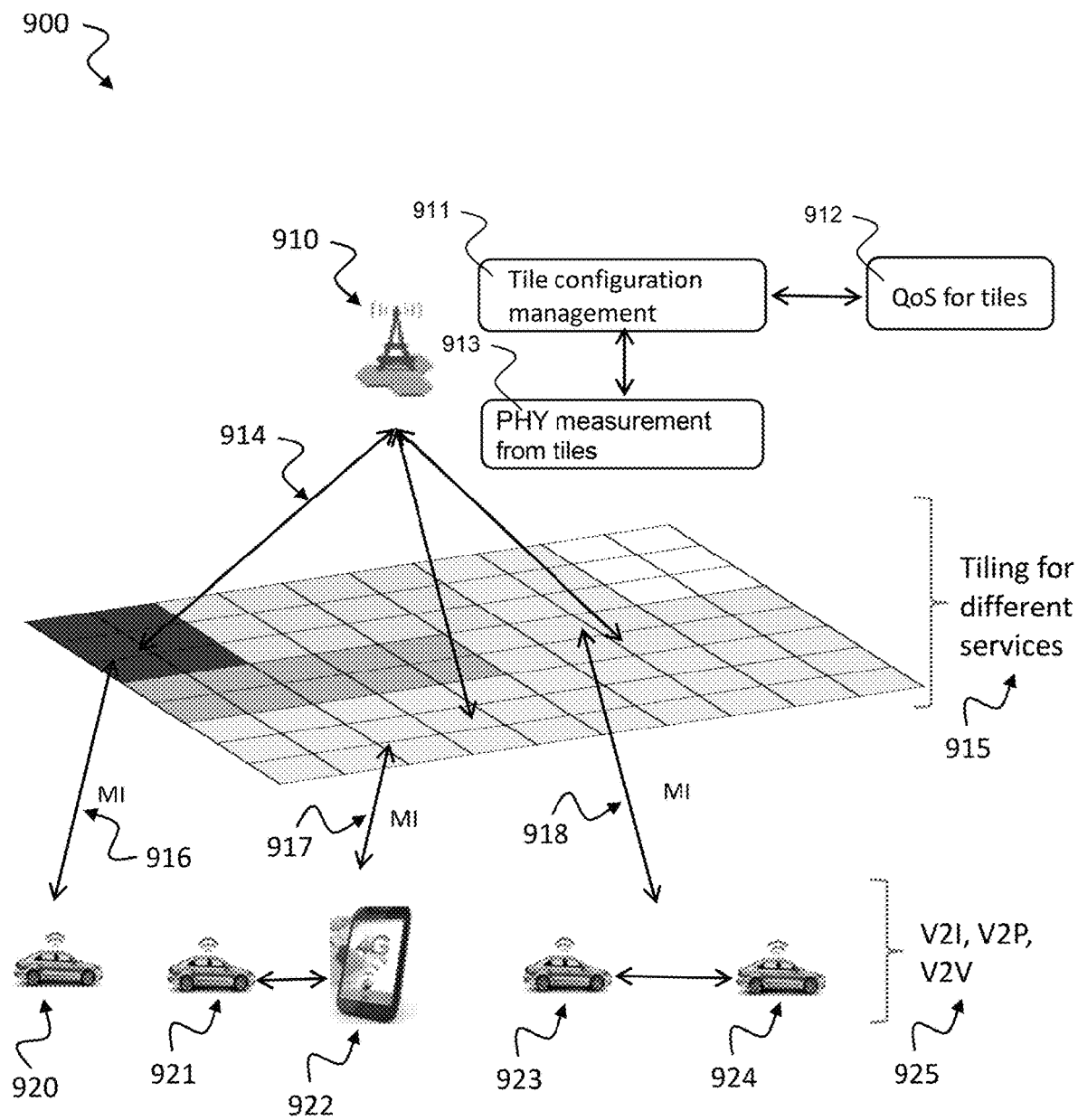
FIG. 9 shows a schematic diagram of a mobile communication system to illustrate the concept of adaptive numerology according to the disclosure.

FIG. 9 shows a schematic diagram of a mobile communication system 900 to illustrate the concept of adaptive numerology according to the disclosure. In the base station 910, tile configuration management 911 is implemented together with QoS for tiles 912 and PHY measurement from tiles 913, e.g. as described above with respect to FIGS. 1, 2 and 6. The BS 910 performs tiling for different services 915, i.e. numerology configuration for different services depending on the mobility information 916, 917, 918 received from the different UEs 920, 921, 922, 923, 924. These UEs 920, 921, 922, 923, 924 may implement different connection scenarios, e.g. sidelink such as V2I, V2P, V2V, 925 or centralized link via BS 910.

Tile configuration management 911 in base station's 910 RRM knows the UE PHY measurement 913 which includes MI feedback information 914 from different tiles and their corresponding QoS service requirements 912.

FIG. 9 shows the different V2x services configured by the BS 910—separated in different tiles (shown in different grey colors). The tiles may form a radio resource, e.g. a radio resource 300 as described above with respect to FIG. 3. The concept of individual tile re-configuration is shown for different services to maintain the QoS with MI feedback from the corresponding UE.

In the following, an exemplary implementation to compute mobility information is described. A table according to Table 1 illustrated below may be used to map mobility index to mobility information, which includes estimates about coherence time and bandwidth.

TABLE 1 exemplary implementation to determine the mobility information

| Mobility Index | Mobility information includes estimates about coherence time and bandwidth |
|---|---|
| Relative speed from Sensor | From the Doppler shift, subcarrier model can be adapted for line of sight communication |
| Sub-band CQI report: require more signaling resource + Relative speed from sensor | Averaging CQI over time for a longer duration provides useful information about Doppler; Precision depends on the CQI periodicity. In general if the coherence time of the channel is smaller than the CQI periodicity then the estimate is not accurate. Also to know about the coherence BW, estimates from the entire band are required for a longer duration. Sub-band CQI estimate together with relative speed from sensor can provide information about Doppler. |
| Delay and Doppler spread estimates + SNR | Provides second order accurate statistical information about the Doppler and delay spread Doppler and delay spread together with estimated SNR could be used to adapt the numerology model effectively. |

The UE can use Mobility Information (MI) to provide the base station with feedback regarding channel condition. The Mobility indicator (MI) enables signaling of UE specific information on the experienced time-varying channel conditions, e.g. in terms of Doppler and multipath to BS. This facilitates numerology adaptation, i.e., subcarrier spacing, cyclic prefix to maintain certain QoS target.

Figure 10:
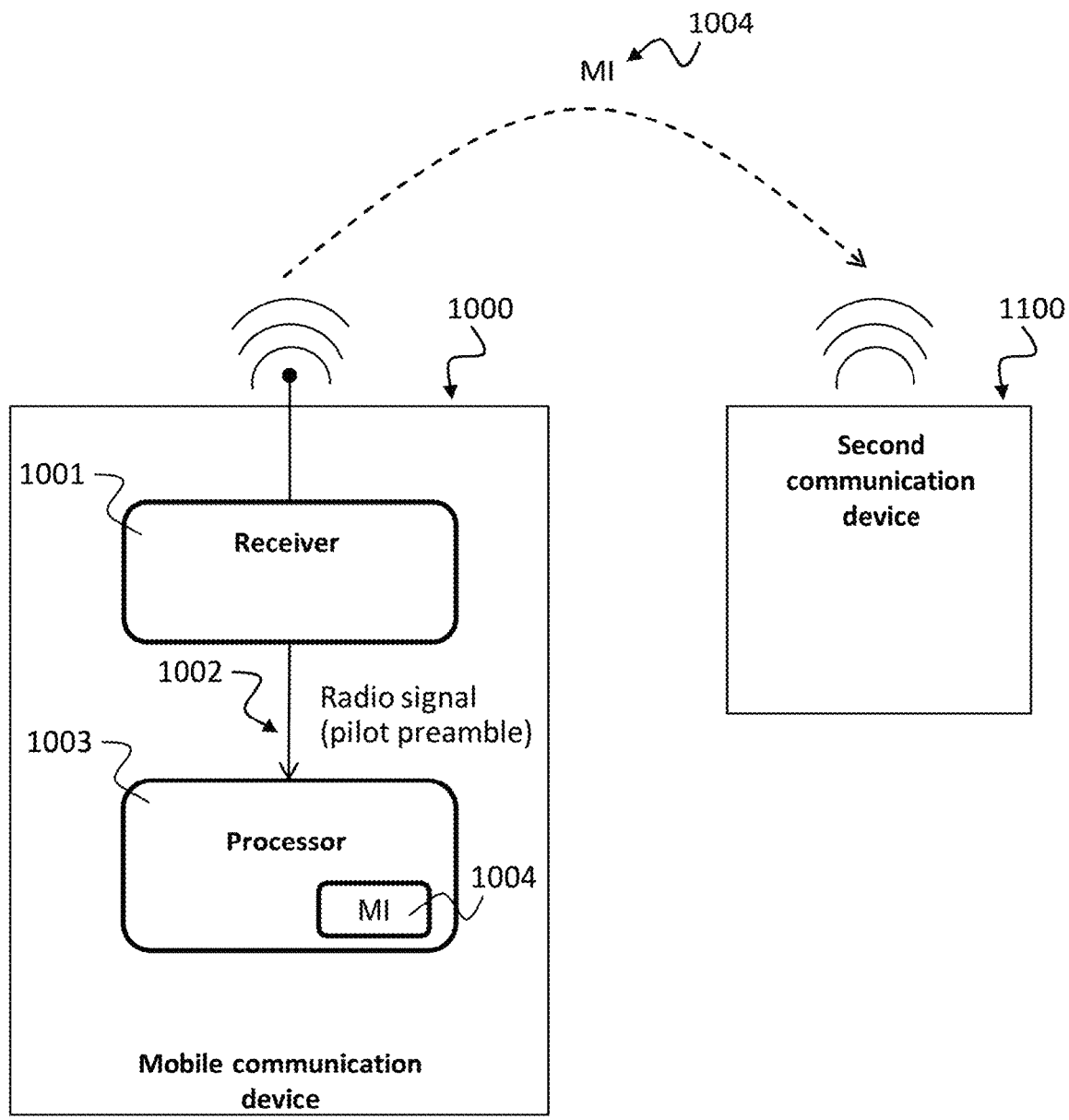
FIG. 10 shows a block diagram of a communication device according to exemplary an implementation form.

FIG. 10 shows a block diagram of a communication device 1000 according to an exemplary implementation form. The communication device 1000, e.g. a UE as described above with respect to FIGS. 1 to 9, includes a receiver 1001 and a processor 1003.

The receiver 1001 is configured to receive a radio signal 1002 over a radio channel. The radio signal 1002 includes a predetermined pilot preamble, e.g. a pilot pattern 700 as described above with respect to FIG. 7. The processor 1003 is configured to determine mobility information 1004, e.g. a Doppler and/or a Delay Spread as described above with respect to FIG. 7, based on the pilot preamble. The processor 1003 is further configured to signal the mobility information 1004 to a second communication device 1100, e.g. a base station 620 as described above with respect to FIG. 6 or a UE 610 as described above with respect to FIG. 6.

The processor 1003 may be configured to provide the mobility information 1004 as a combined value of Delay Spread and Doppler Spread estimate to the second communication device 1100.

The mobility information 1004 may further include a channel quality information (CQI) indicator 612 and a hybrid automatic repeat request (HARQ) indicator 614, e.g. as described above with respect to FIG. 6. The Doppler and/or the Delay Spread may be provided based on outer loop processing 621, e.g. as described above with respect to FIG. 6. The CQI indicator 612 and the HARQ indicator 614 may be provided based on inner loop processing 622, e.g. as described above with respect to FIG. 6. The processor 1003 may be configured to perform the inner loop processing 622 at a higher rate than the outer loop processing 621, e.g. as described above with respect to FIG. 6.

The pilot preamble 700 may include a first part 702 (i.e. a pilot of a first type) configured to estimate the radio channel and a second part 701 (i.e. a pilot of a second type) configured to estimate the Doppler and/or Delay Spread, e.g. as described above with respect to FIG. 7. The first part 702 may be periodic with a radio subframe and the second part 701 may be periodic with at least multiples of the radio subframe, e.g. as described above with respect to FIG. 7. A periodicity of the second part 701 and/or a structure of the first part 702 may be adjustable by a base station 620, e.g. as described above with respect to FIG. 6.

The communication device 1000 may include a user equipment, e.g. a UE 610 as described above with respect to FIG. 6 or a UE 922 as described above with respect to FIG. 9. The second communication device 1100 may include a base station, e.g. a BS 620 as described above with respect to FIG. 6 or a BS 910 as described above with respect to FIG. 9, in a cellular vehicle-to-anything (C-V2x) scenario or a second user equipment, e.g. a UE 610 as described above with respect to FIG. 6 or a UE 921 as described above with respect to FIG. 9, in a vehicle-to-vehicle (V2V) scenario for a sidelink 925.

Figure 11:
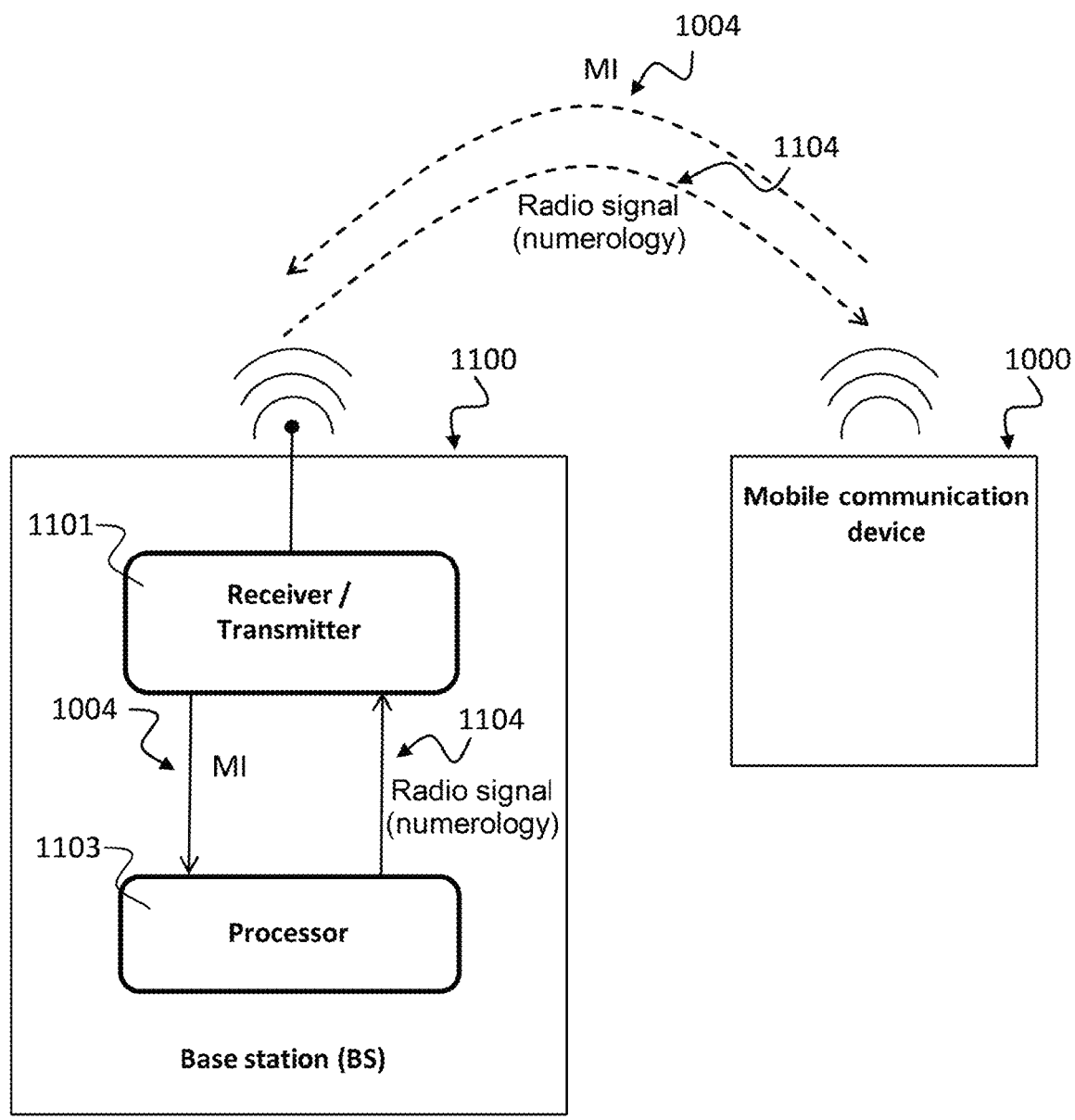
FIG. 11 shows a block diagram of a base station according to an exemplary implementation form.

FIG. 11 shows a block diagram of a base station 1100 according to an exemplary implementation form. The BS 1100 includes a receiver 1101 and a processor 1103. The receiver 1101 is configured to receive mobility information 1004, e.g. a Doppler and/or a Delay Spread, signaled by a communication device, e.g. a communication device 1000 as described above with respect to FIG. 10. The processor 1103 is configured to select a numerology, e.g. a numerology 301, 302, 303, 304 as described above with respect to FIG. 3, based on the signaled mobility information 1004 and to generate a radio signal 1104 for transmission to the communication device 1000 in accordance with the selected numerology 301, 302, 303, 304. The numerology 301, 302, 303, 304 may be based on at least one of the following properties of the radio signal 1104: a subcarrier spacing, a length of cyclic prefix, a pilot distribution, a transmission time interval.

The processor 1103 may be configured to select the numerology 301, 302, 303, 304 based on a metric used to evaluate the mobility information 1004 with respect to a Quality-of-Service requirement. The processor 1103 may be configured: to select a numerology 301, 302, 303, 304 for a sidelink communication of the communication device based on mobility information received for the sidelink, and to select a numerology for a central communication link, e.g. a central communication link 914 as shown in FIG. 9, of the communication device 1000, 922 with the base station 1100, 910 based on mobility information 917 received for the central communication link 914, e.g. as shown in FIG. 9.

The processor 1103 may be configured: to process an outer loop 621 including the numerology selection 623 and numerology configuration, e.g. as described above with respect to FIG. 6. As shown in FIG. 9, for a cellular vehicle-to-anything (C-V2x) scenario 925 the processor 1103 may be configured to re-configure a radio bearer to different time-frequency resources 915 having a numerology based on the signaled mobility information 916, 917, 918. For a device-to-device (D2D) scenario 923, 924 the processor 1103 may be configured to re-configure the numerology of a D2D bearer having allocated time-frequency resources.

As shown in FIG. 6, the base station 1100, 620 may include a shared hybrid automatic repeat request (HARQ) entity 626 across different numerologies 301, 302, 303, 304. The processor 1103 may be configured to trigger each HARQ retransmission based on the signaled mobility information 1004, 616 to a different numerology 301, 302, 303, 304.

The processor 1103 may be configured to select the numerology 115, 116, 117, 125, 126, 127 for at least one component carrier transmitting the radio signal, e.g. as described above with respect to FIG. 1.

The processor 1103 may be configured to insert a predetermined pilot preamble 701 into the radio signal 1104, e.g. as described above with respect to FIG. 7. The pilot preamble 701 may be configured to determine channel conditions, in particular a Doppler and/or a Delay Spread.

The processor 1103 may be configured: to receive a request for a new dedicated radio bearer from the communication device 1000, in particular a user equipment 922 in connected mode, and to configure a numerology 301, 302, 303, 304 of the new dedicated radio bearer based on a QoS priority of the requested radio bearer with prior measurement knowledge about Doppler and delay spread estimates obtained when the communication device 1000, 922 is connected to the base station 1100, 910, e.g. as shown in FIG. 9.

Figure 12:
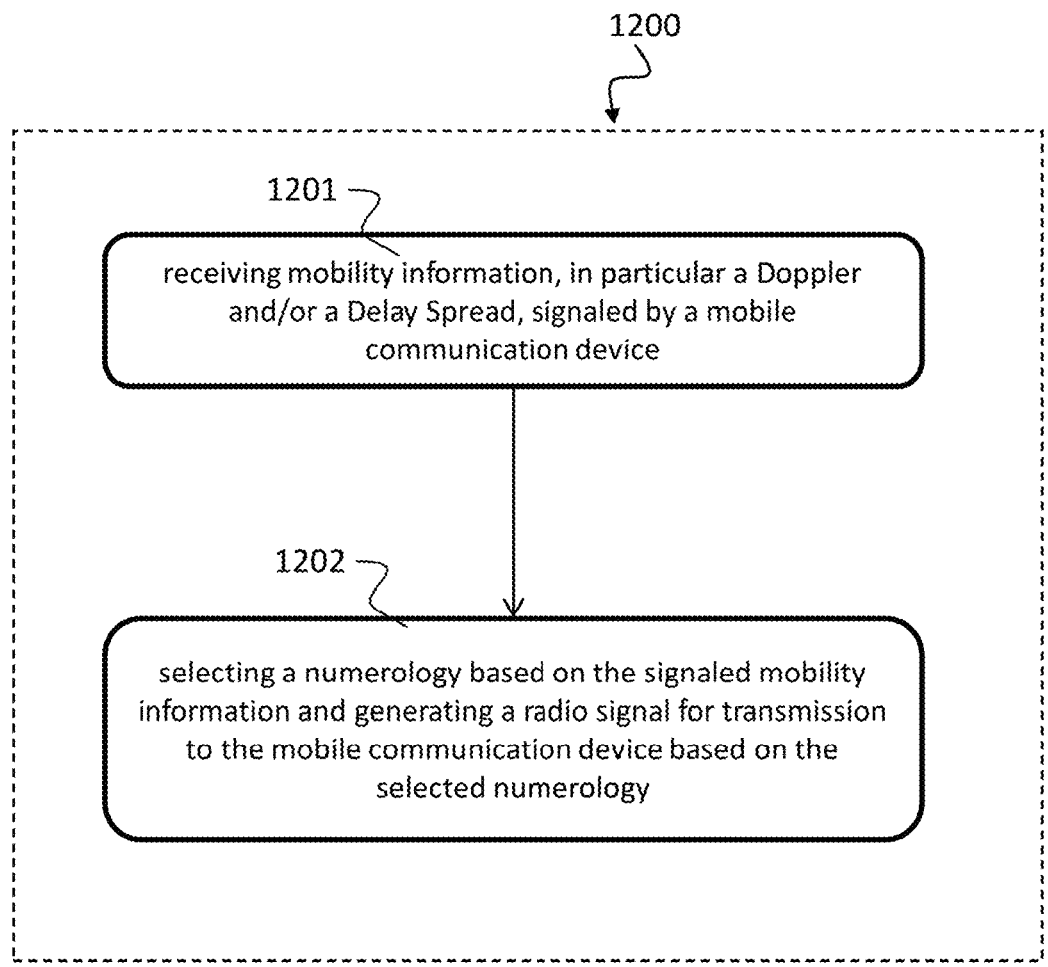
FIG. 12 shows a schematic diagram illustrating a method for configuring a numerology for a radio transmission according an exemplary implementation form.

FIG. 12 shows a schematic diagram illustrating a method 1200 for configuring numerology for radio transmission according an exemplary implementation form.

The method 1200 includes receiving 1201 mobility information, in particular a Doppler and/or a Delay Spread, signaled by a mobile communication device, e.g. a mobile communication device 1000 described above with respect to FIG. 10 or any communication device described above with respect to FIGS. 1 to 9. The method 1200 further includes selecting 1202 a numerology based on the mobility information and generating a radio signal for transmission to the mobile communication device based on the selected numerology, e.g. as described above with respect to FIGS. 1 to 11.

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the processing and computing steps described herein, in particular the method 1200 described above with respect to FIG. 10.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A mobile communication device comprising:
a receiver configured to receive a radio signal over a radio channel, the radio signal comprising a predetermined pilot preamble; and
a processor configured to determine mobility information based on the pilot preamble, the mobility information comprising a Doppler spread and/or a delay spread,
wherein the processor is further configured to signal the mobility information to a second communication device, and
wherein the mobility information comprises the Doppler spread and the delay spread,
wherein the Doppler spread and/or the delay spread are based on outer loop processing, and
wherein the outer loop processing is configured to be performed at a lower rate than a rate used for link adaptation between the mobile communication device and the second communication device.

2. The mobile communication device of claim 1, wherein the processor is configured to determine a pilot of a first type of pilots, which is configured to be used for channel estimation, and a pilot of a second type of pilots, wherein the pilot of the second type of pilots is configured to be used for the determination of the mobility information.

3. The mobile communication device of claim 2, wherein the first type of pilots are periodic with a radio subframe and the second type of pilots are periodic with at least multiples of a radioframe of multiple subframes.

4. The mobile communication device of claim 1, wherein the processor is configured to signal the mobility information to the second communication device that comprises:
a base station in a cellular vehicle-to-anything scenario; or
a mobile communication device in a vehicle-to-vehicle scenario for a sidelink.

5. A base station comprising:
a receiver configured to receive mobility information signaled by a mobile communication device, the mobility information comprising a Doppler spread and/or a delay spread; and
a processor configured to:
select a numerology based on the mobility information and to generate a radio signal for transmission to the mobile communication device based on the numerology, and
wherein the selecting the numerology based on the mobility information comprises selecting the numerology based on the mobility information and a quality-of-service requirement.

6. The base station of claim 5, wherein the numerology is based on at least one of the following parameters based on the mobility information:
a subcarrier spacing,
a length of cyclic prefix,
a pilot distribution, or
a transmission time interval.

7. The base station of claim 5, wherein the processor is configured:
to select a numerology for a sidelink communication of the mobile communication device based on mobility information received for the sidelink, and
to select a numerology for a central communication link of the mobile communication device with the base station based on mobility information received for the central communication link.

8. The base station of claim 5, wherein the processor is configured to perform an outer loop processing comprising the numerology selection and/or a numerology configuration, and
wherein the outer loop processing is performed at a lower rate than a rate used for link adaptation between the base station and the mobile communication device.

9. The base station of claim 8, wherein the processor is configured to re-configure a radio bearer to different time-frequency resources having a numerology based on the mobility information.

10. The base station of claim 5, comprising a shared hybrid automatic repeat request (HARQ) entity across different numerologies,
wherein the processor is configured to trigger each HARQ redundancy versions based on the mobility information to a different numerology of the different numerologies.

11. The base station of claim 5, wherein the processor is configured to select the numerology for at least one component carrier transmitting the radio signal.

12. The base station of claim 5, wherein the processor is configured to insert a predetermined pilot preamble into the radio signal, wherein the pilot preamble is configured to determine channel conditions, in particular the Doppler spread and/or the delay spread.

13. A mobility information sending method for a communication device, the method comprising:
receiving a radio signal over a radio channel, the radio signal comprising a predetermined pilot preamble;
determining mobility information based on the pilot preamble, the mobility information comprising a Doppler spread and/or a delay spread; and
sending the mobility information to a second communication device, and
wherein the mobility information comprises the Doppler spread and the delay spread,
wherein the Doppler spread and/or the delay spread are provided based on outer loop processing, and
wherein the outer loop processing is performed at a lower rate than a rate used for link adaptation between the communication device and the second communication device.

14. The method of claim 13, the method further comprising determining a pilot of a first type of pilots, which is used for channel estimation, and a pilot of a second type of pilots for the determination of the mobility information.

15. The method of claim 14, wherein the first type of pilots are periodic with a radio subframe and the second type of pilots are periodic with at least multiples of a radioframe of multiple subframes.

16. The method of claim 13, wherein the second communication device comprises:
a base station in a cellular vehicle-to-anything scenario; or
a mobile communication device in a vehicle-to-vehicle scenario for a sidelink.

17. A mobility information receiving method for a base station, the method comprising:
receiving mobility information signaled by a mobile communication device, the mobility information comprising a Doppler spread and/or a delay spread;
selecting a numerology based on the mobility information; and
generating a radio signal for transmission to the mobile communication device based on the numerology, and
wherein the selecting the numerology based on the mobility information comprises selecting the numerology based on the mobility information and a quality-of-service requirement.

18. The method of claim 17, wherein the numerology is based on at least one of the following parameters based on the mobility information:
a subcarrier spacing,
a length of cyclic prefix,
a pilot distribution, or
a transmission time interval.

19. The method of claim 17, the method further comprising:
selecting a numerology for a sidelink communication of the mobile communication device based on mobility information received for the sidelink; and
selecting a numerology for a central communication link of the mobile communication device with the base station based on mobility information received for the central communication link.

20. The method of claim 17, the method further comprising performing an outer loop processing comprising the numerology selection and/or a numerology configuration, wherein the outer loop processing is performed at a lower rate than a rate used for link adaptation between the base station and the mobile communication device.

21. The method of claim 20, the method further comprising re-configuring a radio bearer to different time-frequency resources having a numerology based on the mobility information.

22. The method of claim 17, the method further comprising triggering each of a shared hybrid automatic repeat request (HARQ) redundancy versions based on the mobility information to a different numerology.

23. The method of claim 17, the method further comprising selecting the numerology for at least one component carrier transmitting the radio signal.

24. The method of claim 17, the method further comprising inserting a predetermined pilot preamble into the radio signal, wherein the pilot preamble is configured to determine channel conditions, in particular the Doppler spread and/or the delay spread.

\* \* \* \* \*